US006585508B1

(12) United States Patent
Zuffa (10) Patent No.: US 6,585,508 B1
(45) Date of Patent: Jul. 1, 2003

(54) CAROUSEL-TYPE APPARATUS FOR MANUFACTURING CAPS MADE OF PLASTICS BY COMPRESSION MOLDING (75) Inventor: Zeno Zuffa, Borgo Tossignano (IT)

(73) Assignee: Sacmi Cooperativa Meccanici Imola S.c.r.l., Imola (IT)

( * ) Notice: Subject to any disclaimer, the term of this patent is extended or adjusted under 35 U.S.C. 154(b) by 33 days.

(21) Appl. No.: 09/649,024

(22) Filed: Aug. 28, 2000

(30) Foreign Application Priority Data

May 5, 2000 (IT) .................................... BO2000A0256

(51) Int. Cl.[7] .......................... B29C 43/42; B29C 43/50
(52) U.S. Cl. ...................... 425/350; 425/351; 425/438; 425/441; 425/809; 425/DIG. 58
(58) Field of Search ................................. 425/350, 422, 425/438, 443, 809, DIG. 58, 351; 249/59; 264/318

(56) References Cited

U.S. PATENT DOCUMENTS

| 2,155,316 | A |   | 4/1939  | Lauterbach |            |
|-----------|---|---|---------|------------|------------|
| 2,218,456 | A |   | 10/1940 | Soubier et al. |        |
| 4,640,673 | A | * | 2/1987  | Takeda et al. | ............... 425/297 |
| 4,776,782 | A | * | 10/1988 | Murayama et al. | ...... 264/297.6 |
| 5,383,780 | A |   | 1/1995  | McCready et al. |       |
| 5,421,717 | A | * | 6/1995  | Hynds | ........................ 264/334 |
| 5,786,079 | A | * | 7/1998  | Alieri | ......................... 425/349 |
| 6,238,202 | B1| * | 5/2001  | Joseph | ........................ 425/556 |

FOREIGN PATENT DOCUMENTS

EP         0 654 335      5/1995
EP         0 654 342      5/1995
WO         86 03793       11/1983

OTHER PUBLICATIONS

Patent Abstract of Japan vol. 012, No. 142 (M–692) Apr. 30, 1988 & JP 62 264923 A (Sumitomo Heavy Ind Ltd), Nov. 17, 1987 cited in the application abstract.

* cited by examiner

Primary Examiner—James P. Mackey
Assistant Examiner—Donald Heckenberg
(74) Attorney, Agent, or Firm—Guido Modiano; Albert Josif; Daniel O'Byrne (57) ABSTRACT An apparatus for manufacturing threaded caps comprises a plurality of compression molding assemblies which are arranged on a rotating carousel and comprise an upper male mold half and a lower female mold half. The male mold half comprises a tubular element, a sleeve guided coaxially to said tubular element, and a punch guided in the tubular element and having a helical slot for forming the thread of the cap. The punch enters the female mold half and produces, together with it, the cap through compression of a dose of plastic material deposited in the female mold half. After the spacing of the punch from the female mold half, the removal of the cap from the punch occurs by way of a removal device, which comprises a ring gear associated with the sleeve and provided with a collar in sliding contact on the punch, a rod which can slide axially in a seat of the carousel and supports a gear meshing with the ring gear and connected to a motor drive mechanism. The rod is axially connected to the sleeve and is controlled by a stationary actuation cam which is suitable to impart axial movements to the rod. The cam and the motor drive mechanism are synchronized so as to move axially and rotate the collar so as to produce the unscrewing of the cap from the punch.

20 Claims, 9 Drawing Sheets

CAROUSEL-TYPE APPARATUS FOR MANUFACTURING CAPS MADE OF PLASTICS BY COMPRESSION MOLDING

BACKGROUND OF THE INVENTION

The present invention relates to a carousel-type apparatus for manufacturing threaded plastics caps by compression molding.

Such apparatuses are already known, for example from publication PCT/EP95/03644 in the name of the Applicant, from German publication no. 2,007,777, from European publications no. 91,653 and 162,456, and from U.S. Pat. Nos. 2,155,316, 2,891,281, 4,343,754, 4,497,765, 4,640, 673, 5,451,360, 5,554,327.

Compression molding apparatuses generally comprise a carousel which can rotate about a vertical axis and on which a plurality of molding assemblies are installed so as to be spaced one another by an equal angle. Each assembly comprises an upper male mold half (punch) which is aligned with a lower female mold half.

A dose of semifluid plastic material is introduced in the female mold half and compressed by means of a relative motion of the two mold halves in order to obtain the item.

In the manufacture of caps for closing containers, the molded cap, which remains attached to the punch after the opening of the mold halves, is removed by means of an ejector.

In the case of caps provided with an internal thread, removal occurs by utilizing the elasticity of the material, which allows to force the cap on its threads.

In order to prevent the caps from being damaged due to the forcing with which they are removed, solutions have been proposed which entail unscrewing the punch while the cap is rotationally locked or unscrewing the cap from the punch by means of an external element. Solutions for removing the caps from the molds are known from Japanese publications no. 62-264923 and 4-113820 and from U.S. Pat. Nos. 2,363,308, 2,799,049, 3,712,786, 3,856,255, 4,496, 302, 5,383,780.

However, conventional solutions are applied exclusively to injection molding machines and are constructively too complicated and heavy to be used in carousel-type apparatuses, in which the opening of the mold and the expulsion of the caps must be actuated in very specific angular positions and in which it is important to reduce the rotating mass.

SUMMARY OF THE INVENTION

The aim of the present invention is therefore to devise a carousel-type apparatus in which said caps are rotated with respect to the male mold half in order to remove them.

Within the scope of this aim, an object of the present invention is to provide a carousel-type apparatus in which the molds are structurally simple, reliable in operation and easily adaptable to the characteristics of the caps to be manufactured.

This and other objects are achieved with an apparatus whose characteristics are defined in the appended claims.

BRIEF DESCRIPTION OF THE DRAWINGS

Further features and advantages of the present invention will become better apparent from the following description of two preferred embodiments, illustrated only by way of non-limitative example in the accompanying drawings, wherein.

DESCRIPTION OF THE PREFERRED EMBODIMENTS

Figure 5:
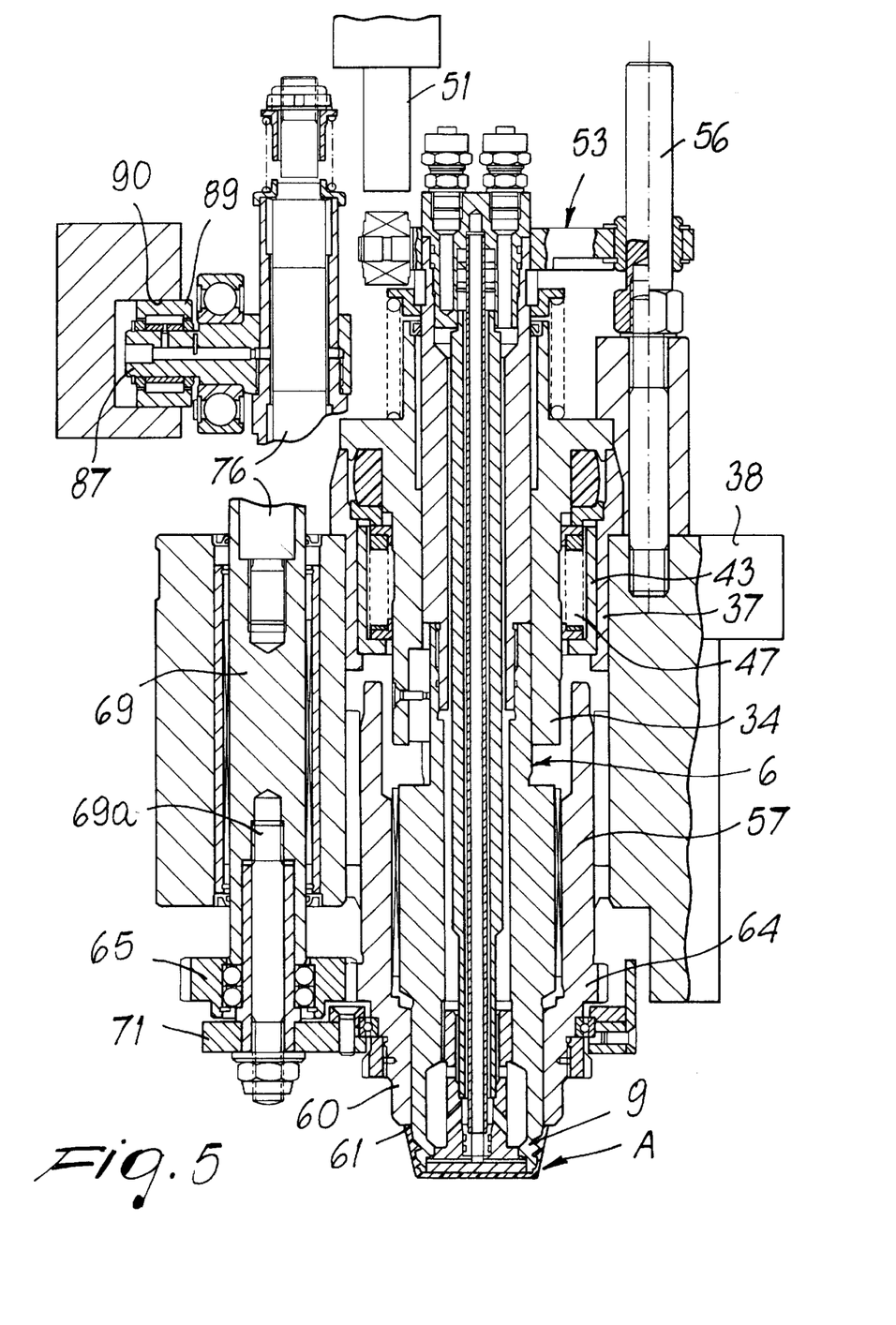
FIGS. 5, 6 and 7 are views of the assembly in various successive operating conditions.
Figure 6:
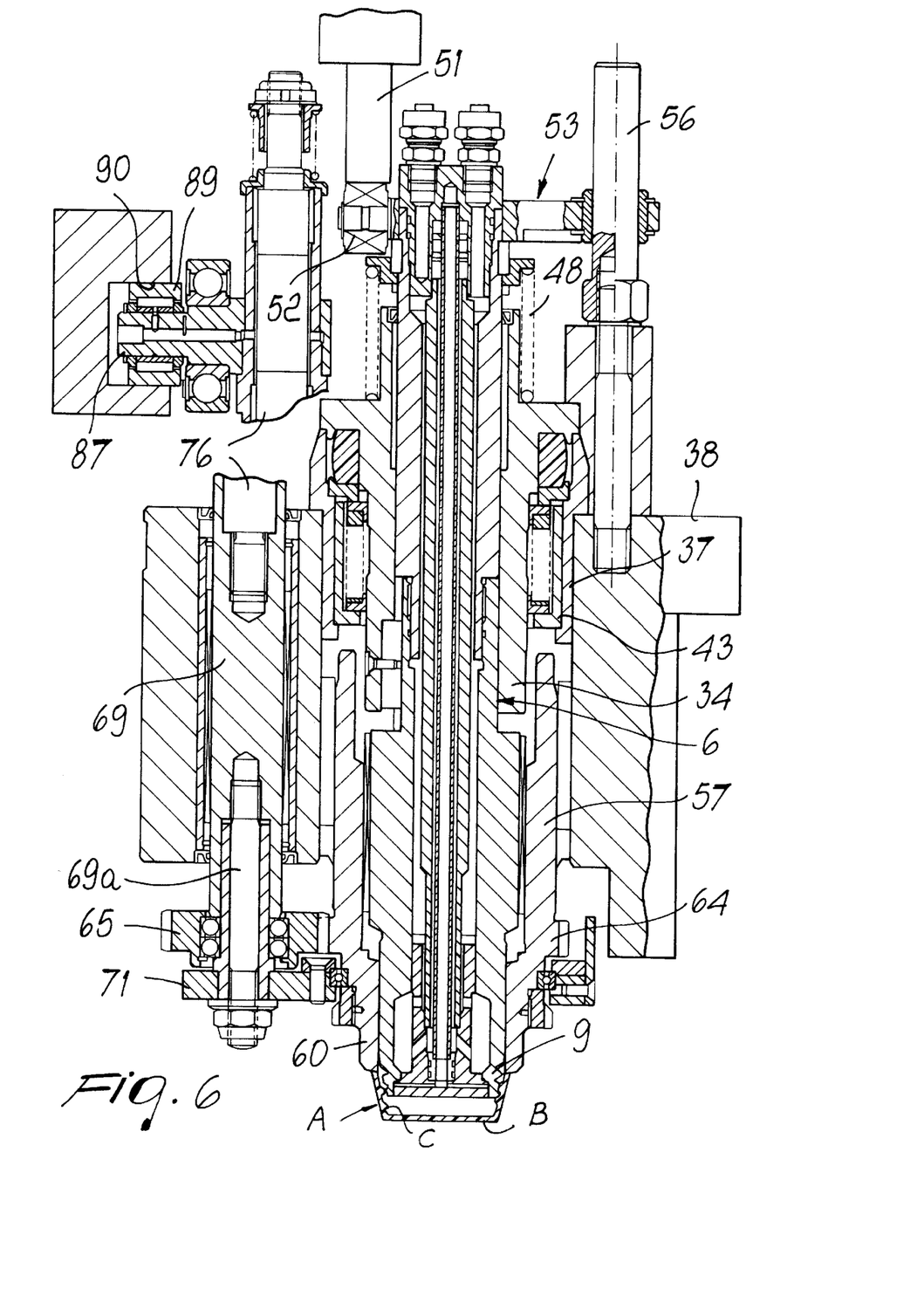
Figure 7:
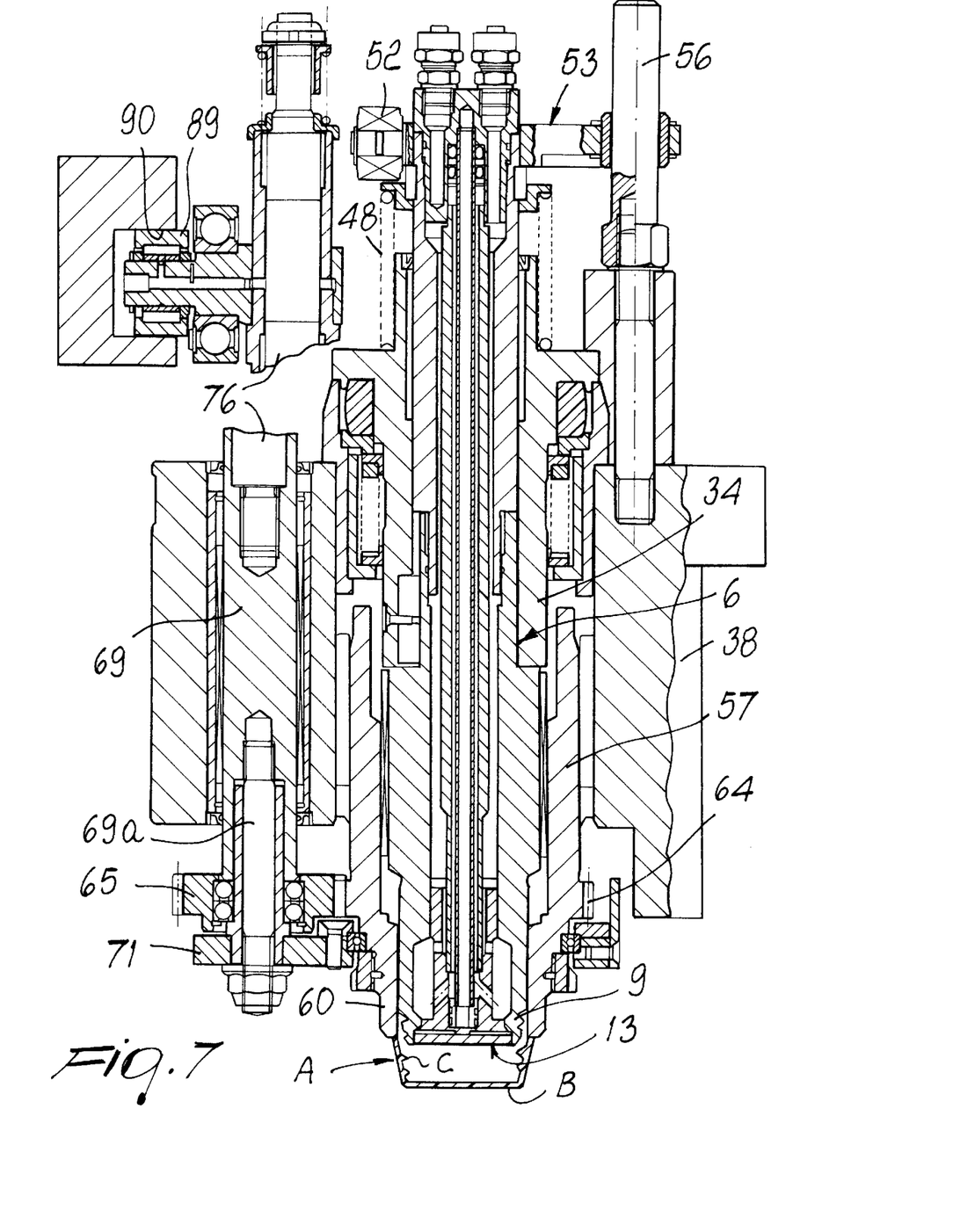

With reference to FIGS. 1 to 4, the apparatus is constituted by a carousel which can rotate about a vertical central axis Z and supports, on its peripheral region, a plurality of assemblies for molding frustum-shaped plastic caps (closures) (see FIGS. 5–7).

Hereinafter, it is assumed that said caps A are composed of a frustum-shaped cup B which is provided with an internal thread C. Each assembly is composed of an upper male mold half, generally designated by the reference numeral 1, and by a lower female mold half, generally designated by the reference numeral 2, which are mutually coaxial along an axis X which is parallel to the axis Z. The female mold half 3 can be actuated against the male mold half 1 by means of a hydraulic jack, not shown.

Figure 1:
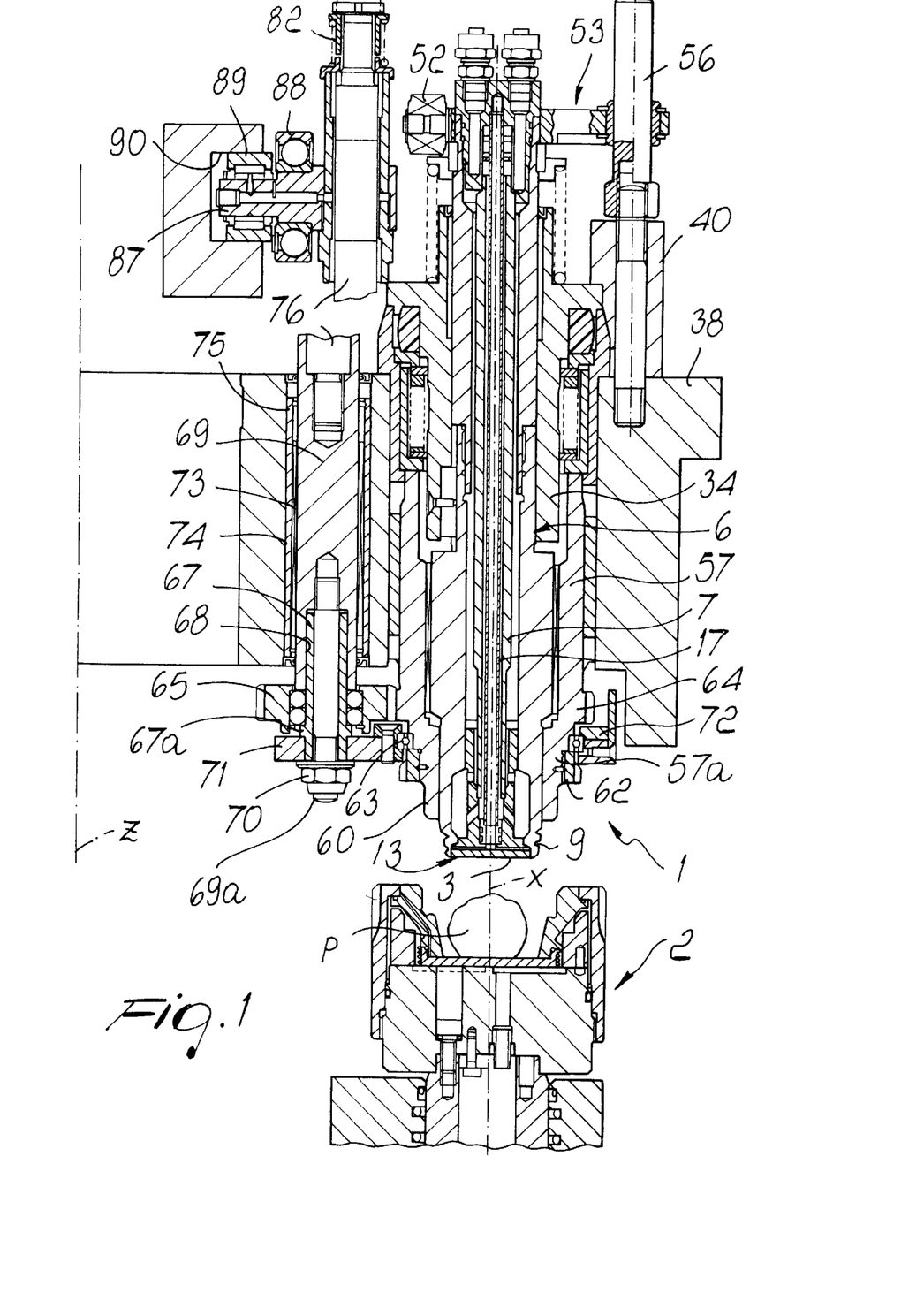
FIG. 1 is a sectional elevation view, taken along a vertical plane, of a first embodiment of a compression molding assembly, shown with the mold open, for forming a frustum-shaped screw cap.

The male mold half 1 comprises a plate 3 which is screwed into a sleeve 5 by means of a tubular shank 4; said sleeve 5 is in turn screwed into the lower end of a hollow tube 5a so as to form a single tubular stem 6 (FIG. 1).

A pipe is inserted hermetically in the tubular shank 4 and defines a tubular interspace 8 together with the tubular stem 6 (i.e., with the sleeve 5 and the tube 5a). The sleeve 5 has, at its lower end, a portion 9 which tapers downward and is externally threaded; the plate 3 is centered hermetically in said portion and forms, together with the tubular shank 4, a chamber 10 which is connected to the interspace 8 through openings 11 of the tubular portion 4. Moreover, the chamber 10, through openings 12 provided in the region of the shank 4 directly above the plate 3, is connected to the inside of the pipe 7.

The portion 9 of the sleeve 5 and the plate 3 form the molding punch 13, which produces the worm of the thread C inside the cap A.

The upper end of the pipe 7 is connected hermetically in a seat 16 of a cylindrical body which is in turn screwed hermetically, by means of a threaded portion thereof, in a seat 15 formed at the upper end of the hollow tube 5a.

A narrow tube 17 lies coaxially inside the pipe 7, protrudes out of the top of the pipe 7 and is inserted hermetically in a hole 18 of the body 14. The narrow tube 17, together with the pipe 7, internally delimits a tubular channel 19 which is connected to the seat 16.

The lower end of the narrow tube 17 is inserted hermetically in a bush 20 (FIG. 3) which is in turn hermetically inserted in the bottom of the shank is 4. The narrow tube 17, through the axial hole 21 of the bush 20, is connected to a plurality of holes 22 which are formed radially on the outside of the punch 13 through ports 23 constituted by openings provided in the centering region of the bell-shaped portion 9 between the edge of said portion and the plate 3.

The upper end of the narrow tube 17 is connected, through a hole 24 arranged diametrically to the hole 18, to a supply of compressed air, which accordingly, after flowing through the narrow tube 17, can exit through the radial holes 22 and the openings 23.

Two axial holes 25, 26 are formed in the body 14, eccentrically with respect to the hole 18, and are connected by means of couplings 27, 28 to the delivery and the return of a coolant fluid. The hole 26 is connected to the interspace 8, while the hole 25 is connected to the tubular channel 19 through a radial opening 29. This provides a connection between the couplings 27 and 28 which allows recirculation of the coolant fluid.

The upper portion 30 of the sleeve 5, screwed onto the hollow tube 5a, has a smaller diameter than the remaining portion, so as to form an external annular shoulder 31. An axial slot 32 is formed in the portion 30 and is slidingly engaged by a key 33 which is rigidly coupled inside a tubular element 34 in which the stem 6 is slidingly guided with the portion 30 and the hollow tube 5a.

The tubular element 34 is provided with a flange 35 which is centered in a cylindrical case 37 by means of a lower annular lip 36.

The cylindrical case 37 is inserted in a cylindrical seat 38a of a rotating body which belongs to the structure of the carousel. Said body is constituted by a sort of rotating drum 38 which is mounted on a vertical shaft (not shown) whose axis is the rotation axis Z of the carousel. The case 37 rests on the drum 38 with a shoulder 39, so as to allow the mutual coaxial locking of the tubular element 34 and of the cylindrical case 37 by means of blocks 40 which are fastened onto the drum 38 by screws 41.

A compartment 42 is formed between the case 37 and the tubular element 34 and accommodates a bush 43 which has an internal lip 44 at its lower end. A center bearing 45 is arranged at the top of the bush 43 and is guided between the wider portion of the case 37 and the tubular element 34.

A ring 46 of elastic material is placed between the flange 35 and the center bearing 45, and a cylindrical spring 47 is interposed between the center bearing 45 and the lip 44 of the bush 43.

The stem 6 can move between a raised position and a lowered position. The raised position is determined by the abutment of the shoulder 31 against the lower end of the tubular element 34 by means of the lifting action applied to the stem 6 by an additional cylindrical spring 48 which rests on the flange 35 in a downward region and on a ring 49 in an upward region, said ring abutting against circular segments 50 which are recessed in a perimetric slot of the body 14.

The lowered position of the stem 6 is determined by a stationary cam 51 which, as will become apparent hereinafter from the description of the operation of the apparatus, acts on a free roller 52 which protrudes from a plate 53 which is applied to the body 14 which rests on the segments 50. The plate 53 is provided with an arm 54 which, by means of a bearing 55, can slide on a post 56 which rises vertically from the screw 41 on which it is screwed with the lower nut-shaped end 56a.

A sleeve 57 is accommodated in the portion of the seat 38a arranged below the bush 43, and its upper end is in contact with the lip 44 of the bush 43.

The sleeve 57 is supported so that it can rotate and slide axially in the seat 38a by means of a bearing 58 and rotationally and axially supports the sleeve 5 by means of an additional bearing 59.

The sleeve 57 comprises a portion 57a which protrudes below the drum 38 and ends with a collar 60 which is in sliding contact on the sleeve 5 and has, along its lower edge, teeth 61 for engagement on the edge of the cap A which is to be removed once molding has been completed.

A bearing 63 is fixed above the collar 60 by means of a ring 62, and a ring gear 64 is formed above said bearing.

The ring gear 64 meshes with a gear 65 which can rotate, by means of a bearing 66, on a pipe 67 which is inserted in a recess 68 of a rod 69 which passes through the drum 38.

A bolt 69a is inserted in the pipe 67 and is screwed into the bottom of the recess 68, on which the pipe 67 is fixed by a nut 70.

The rod 69 is mechanically connected to the sleeve 57 by a plate 71 which is fixed by the nut 70 against a collar 67a of the pipe 67 and has a seat in which the outer ring of the bearing 63 is fixed by means of a ring 72. Accordingly, the axial movement of the rod 69 actuates the simultaneous axial movement of the sleeve 57, while the ring gear 64 and the gear 65 remain mutually in mesh.

The rod 69 can slide vertically, by means of a bearing 73, in a jacket 74 which is inserted in a seat 75 of the drum 38.

The rod 69 protrudes upward with a shank 76, screwed into a threaded hole of the rod 69, and supports a cuff 78 arranged so as to be slideable on interposed bearings 77.

The cuff 78 has a shoulder 79 and is surmounted by a plate 80 which is centered on the edge of the cuff 78 with a peripheral lip 81. A precompressed spring 82 rests on the plate 80, and its top rests on a collar 83 of a bush 84 which is guided on a threaded end portion 76a of the shank 76. The collar 83 is pushed by the precompressed spring 82 against a bolt 85 which is screwed into the threaded end portion 76a of the shank 76 so as to be able to adjust the precompression of the spring 82.

A ring 86 is screwed onto the cuff 78 until it abuts against the shoulder 79, and a stem 87 protrudes from said ring and supports two rollers 88 and 89. The roller 89 is engaged in a cam 90 which is rigidly coupled to the fixed structure of the apparatus and is therefore stationary with respect to the drum 38. The roller 88 is guided in a vertical slot of a bracket (not shown in the drawing) which is fixed to the drum 38 and is designed to prevent the rotation of the shank 76 and of the rod 69.

The cam 90 has a circular path which is concentric to the rotation axis Z of the carousel, so as to apply axial movements to the rod 69 and, by means of the connection provided by the plate 71, to the sleeve 57.

The gear 65 meshes constantly with an idler gear 91 which is rotatably supported on a pivot 92 which protrudes downward from the drum 38 and is parallel to the rod 69.

The gear 91, which as shown by the drawing is arranged on a rearward plane with respect to the plane of the gear 65, has longer teeth than the gear 65, so as to always remain in mesh with it even when the gear 65 moves away from the drum 38 in order to follow the movements of the rod 69.

Figure 3:
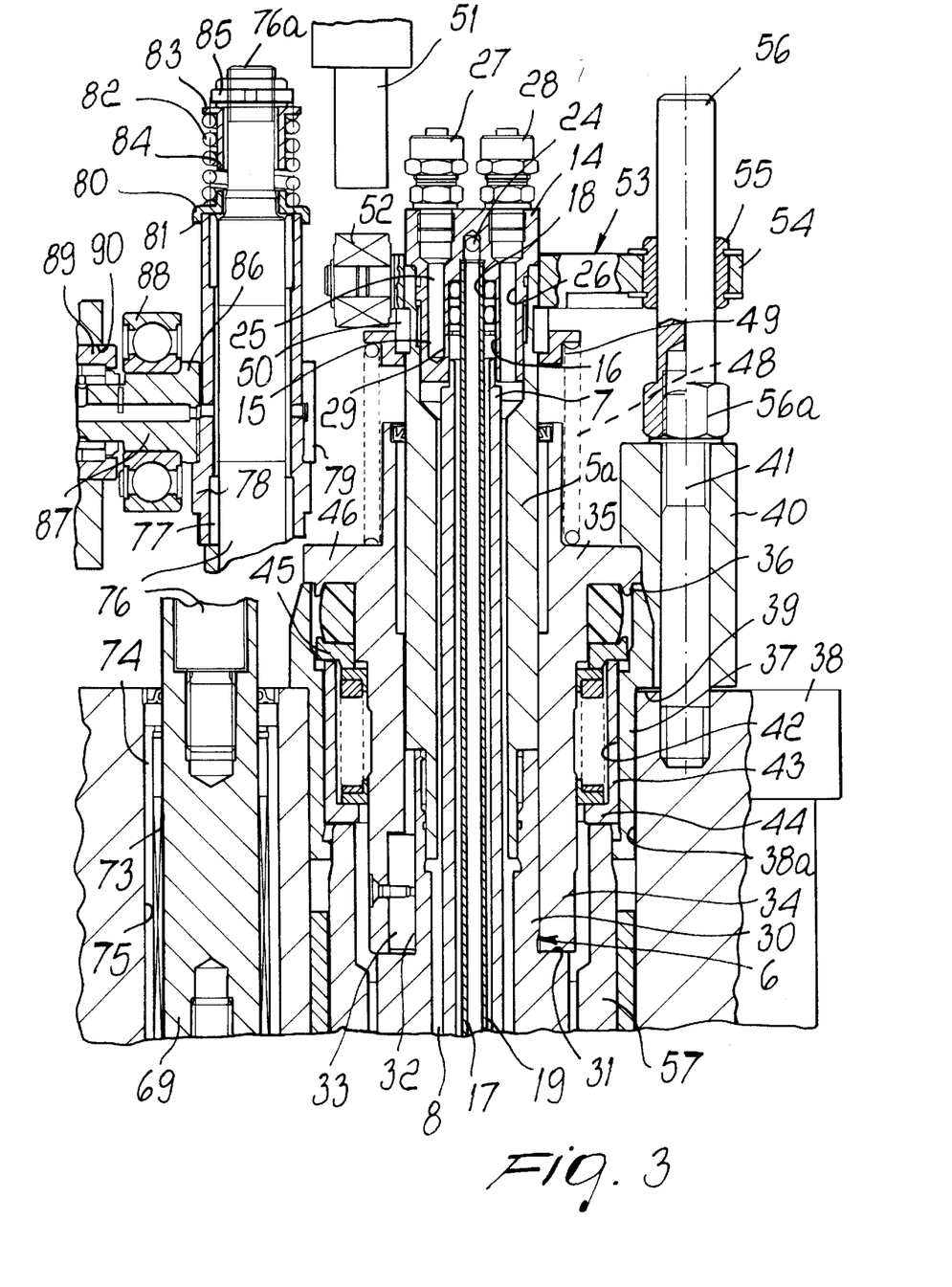
FIGS. 3 and 4 are enlarged-scale views of the upper half and, respectively, of the lower half of the assembly of FIG. 2, with the mold closed.
Figure 4:
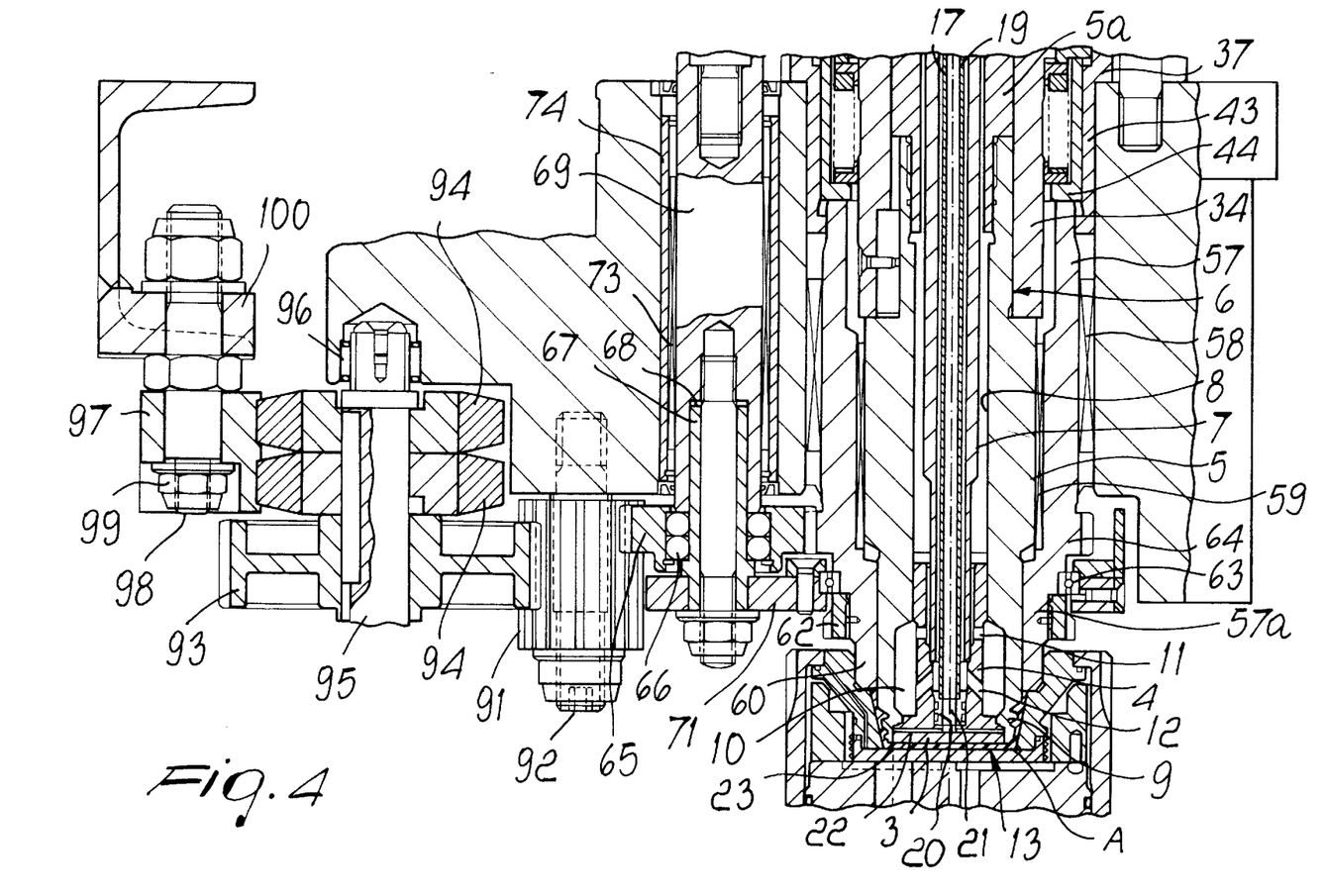

A third gear 93 meshes with the gear 91 and is keyed, together with two friction wheels 94, on a shaft 95 which is supported so that it can rotate below the drum 38. FIG. 3 illustrates only the upper part of the shaft 95 with the corresponding supporting bearing 96, which is accommodated in a seat of the drum 38.

The friction wheels 94 are made of rubber-like material and are adapted to make contact with a track 97 which covers a certain angular portion outside the drum 38 and concentrically to the axis Z. The track 97 is fixed, by means of bolts 98 and nuts 99, to fixed parts 100 of the apparatus, so as to produce a radial thrust on the friction wheels 94 which is sufficient to turn them and, with them, the sleeve 57 by means of the gear train 93, 91 and 65.

The operation of the described apparatus is as follows, During the rotation of the carousel, a dose P (see FIG. 1) of plastic material having a pasty consistency is deposited in the cavity of the female mold half 2. During this step, the female mold half 2 is lowered with respect to the punch 13, which by means of the spring 48 is actuated in the upward stop position determined by the abutment of the shoulder 31 of the stem 6 against the lower end of the tubular element 34.

The stationary cam 90, which actuates the stroke of the rod 69 and therefore of the sleeve 57, is shaped so that in this step the threaded portion 9 of the punch 13 lies below the collar 60.

By means of the hydraulic lifting of the female mold half 2, the collar 60 abuts against an internal annular step of the female mold half 2, the molding chamber is closed by the punch 13 and the stem 6 is lifted until the shoulder 31 abuts against the lower end of the tubular element 34.

Figure 2:
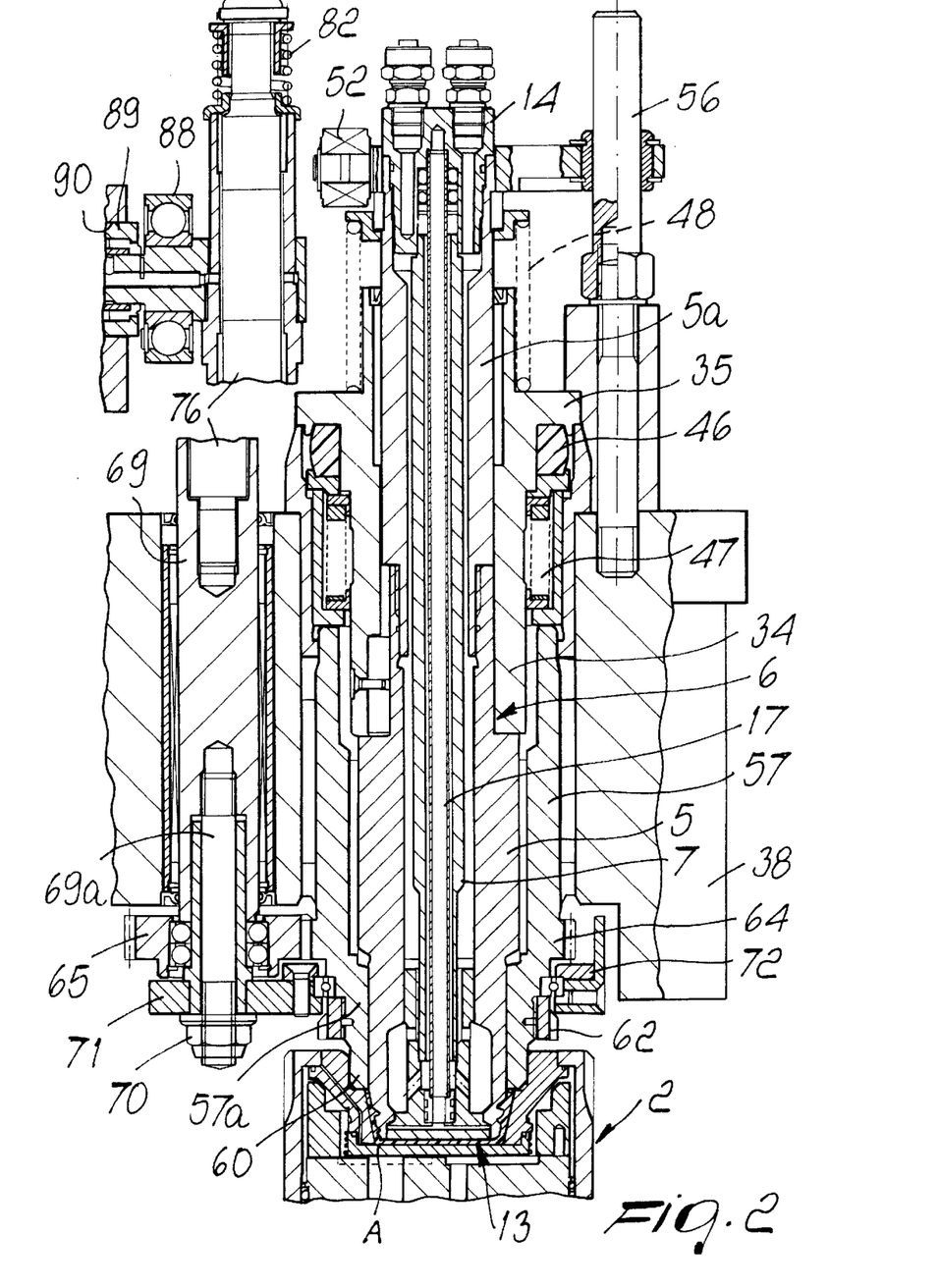
FIG. 2 is an enlarged-scale view of the assembly of FIG. 1, with the mold closed.

Therefore, the pressure applied to the female mold half 2 produces the gradual distribution of the plastic material in the molding chamber and the forming of the cap A (see FIG. 2).

It should be observed that the thrust applied by the female mold half 2 to the collar 60 causes a movement of the bush 43 which compresses the elastic ring 46.

When the plastic material has reached an adequate hardening point, determined by feeding coolant liquid into the chamber 10 and into the chamber of the female mold half 2, so that there is no further risk of plastic deformations, the descent of the female mold half 2 is actuated. However, when the female mold half 2 moves away, the cap A does not fall but remains attached to the punch 13 due to the thread.

When the female mold half 2 has moved away and the molding assembly has again reached the position of FIG. 1, the cam 90 actuates the descent of the rod 69, which by means of the plate 71 draws downward with it the sleeve 57. In this way, the collar 60 acts on the edge of the cap A which, by means of the thread, draws downward with it, with a stroke which is equal to the stroke of the rod 69, the stem 6 (see FIG. 5), causing the compression of the spring 48. At this point, in an appropriate angular position of the carousel, the friction wheels 94 engage the track 97 so as to start, by means of the gear train 93, 91, 65 and 64, the rotation of the sleeve 57 in the direction for unscrewing the cap A from the portion 9. The unscrewing of the cap is provided by the traction applied by the teeth 61 to the edge of the cap and by the simultaneous rise of the stem 6 caused by the return force applied by the spring 48 (see FIG. 7).

Since during this unscrewing step the material of the cap A has not yet solidified perfectly, in order to prevent the return force of the spring 48 from stripping the last turns of the thread, the cam 51 intervenes: by making contact with the roller 52, said cam prevents a sudden upward movement of the stem 6, allowing only its gradual rise as unscrewing of the cap advances (see FIG. 6).

Extraction of the cap from the punch 13 is conveniently facilitated by the injection of compressed air through the narrow tube 17, the radial channels 22 and the openings 23 even before the cap unscrewing step begins.

The injection of compressed air is adjusted by valve means which intervene when the female mold half 2 has separated from the punch 13.

The described apparatus is susceptible of numerous modifications and variations, all of which are within the scope of the same inventive concept.

Figure 8:
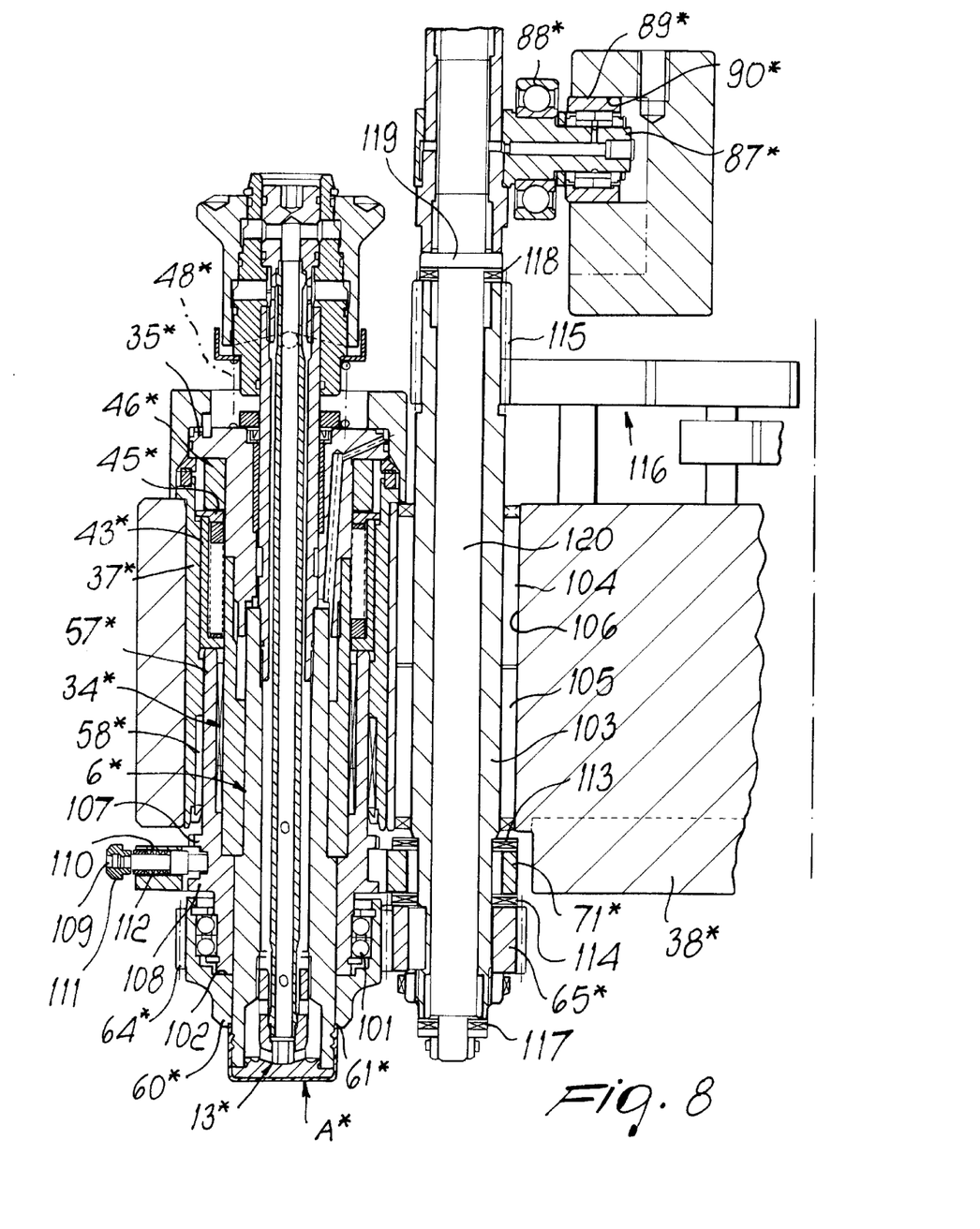
FIG. 8 is an elevation view of a second embodiment of a compression molding assembly.

One of these is shown in FIG. 8, in which the elements or parts that are identical or equivalent to those of the embodiment of FIGS. 1 to 4 are designated by the same reference numerals with the addition of an asterisk (*).

FIG. 8 shows the tubular stem 6*, which supports, at its lower end, the shaped punch 13* for forming cylindrical caps A*. The tubular stem 6* can slide in a tubular element 34* on which the sleeve 57* is guided. By means of a bearing 58*, the sleeve 57* is guided in the provided seat of the drum 38*.

With respect to the version of FIGS. 1 to 4, a ring gear 64* can rotate by means of a bearing 101 on the lower portion of the sleeve 57*, and a collar 60* protrudes downward from said ring gear in sliding contact on the outer surface of the punch 13*.

The collar 60* has, at the top, a circular plane 102 for contact with the lower edge of the sleeve 57* and, in a downward region, a plurality of teeth 61* for engagement on the edge of the cap A*.

The ring gear 64* meshes with a gear 65* which is keyed on a tubular column 103 which is supported so that it can rotate and slide axially, by means of bearings 104 and 105, in a guiding seat 106 of the drum 38* which is parallel to the stem 6* and is radially internal thereto with respect to the rotation axis Z of the carousel.

The tubular column 103 is driven through a plate 71* which connects it to the sleeve 57*. The plate 71* has an opening for the passage of the sleeve 57*; said opening is shaped so that its edge engages between two flanges 107, 108 of the sleeve 57* and produces a side-fit (axial and rotary) coupling with the sleeve 57*. The angular arrangement of the sleeve 57* with respect to the plate 71* is provided by means of a pin 109 which is guided in a radial hole 110 of the plate 71* and can move by acting on an external knob 111 in contrast with the action of a return spring 112.

The plate 71* is rigidly coupled to the tubular column 103, at the portion that lies between the gear 65* and the lower face of the drum 38*, by means of two thrust bearings 113 and 114 which allow the rotation of the tubular column 103 and the transfer of thrusts onto the plate 71* and therefore onto the sleeve 57*.

The upper end of the tubular column 103 lies above the drum 38*, and a pinion 115 is formed thereon; said pinion is connected, by means of a gear train generally designated by the reference numeral 116, to a source of motion. The pinion 115 has an axially extended set of teeth, so as to remain in mesh with the gears 116 during the axial movements of the tubular column 103.

A cylindrical rod 120 (which corresponds to the parts 69, 76 of the version of FIGS. 1 to 4) is rotatably supported, by means of a lower bearing 117 and an upper bearing 118, in the tubular column 103, and rests on the column by means of a flange 119. The top of the rod 120 protrudes from the tubular column 103, and a stem 87* is radially fixed thereon and supports a follower roller 89* of an axial cam 90*.

The cam 90* is rigidly coupled to the fixed structure of the apparatus and is therefore stationary with respect to the drum 38*, and its shape is circular and concentric with respect to the rotation axis Z of the carousel. In order to keep the roller 89* engaged on the profile of the cam 90*, a roller 88* is arranged on the stem 87*, on the outside of the cam 90*, and is guided in a vertical slot of a bracket (not shown in the drawing) which is rigidly coupled to the drum 38* and is meant to prevent the rotation of the rod 120.

The cam 90* positively actuates the downward movements of the sleeve 57* only over an angle which is sufficient to remove the cap A* formed by the punch 13*; over the remaining rotation angle, the sleeve 57* can move upward in contrast with elastic abutment means.

Said means are constituted by a ring of elastic rubber-like material 46* which is interposed between the flange 35* of the tubular element 34* and a center bearing 45* which rests on a bush 43* which is accommodated in the case 37*. The bush 43* has an internal lip 44* on which a cylindrical spring 47* rests, said spring being suitable to act against the center bearing 45*.

The operation of the described apparatus is the same as the operation of the embodiment of FIGS. 1–4.

In particular, when the female mold half has moved away from the punch 13* and the cap A* is still attached to said punch, the cam 90* actuates the descent of the rod 120 and starts the rotation of the tubular column 103 by means of the gear train 116, so that the collar 60* performs a descent and rotation which cause the unscrewing of the cap A* from the punch 13*. It should be observed that the axial thrust on the rod 120, actuated by the cam 90* and transmitted to the collar 60* by means of the plate 71* and the sleeve 57*, acts on the cap A*, which is actuated downward, drawing with it the punch 13* and the stem 6* and compressing the return spring 48*.

However, the simultaneous rotation of the collar 60* causes the rotation of the cap A*, which by unscrewing from the punch 13* allows it to rise due to the return force applied by the spring 48*.

Figure 9:
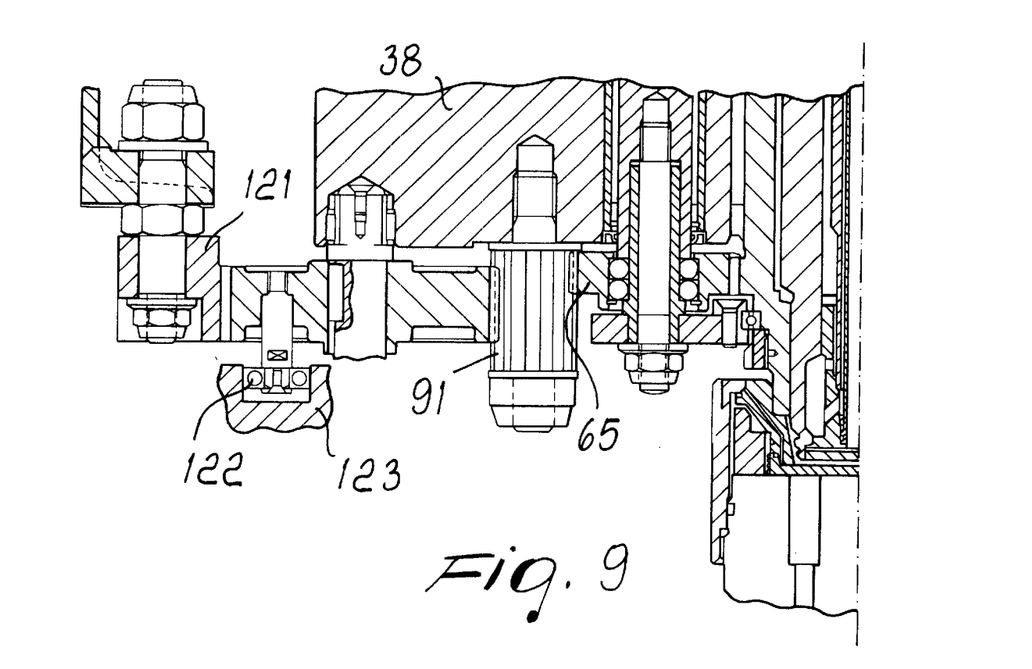
FIG. 9 is a sectional view of a third embodiment of the present invention.
Figure 10:
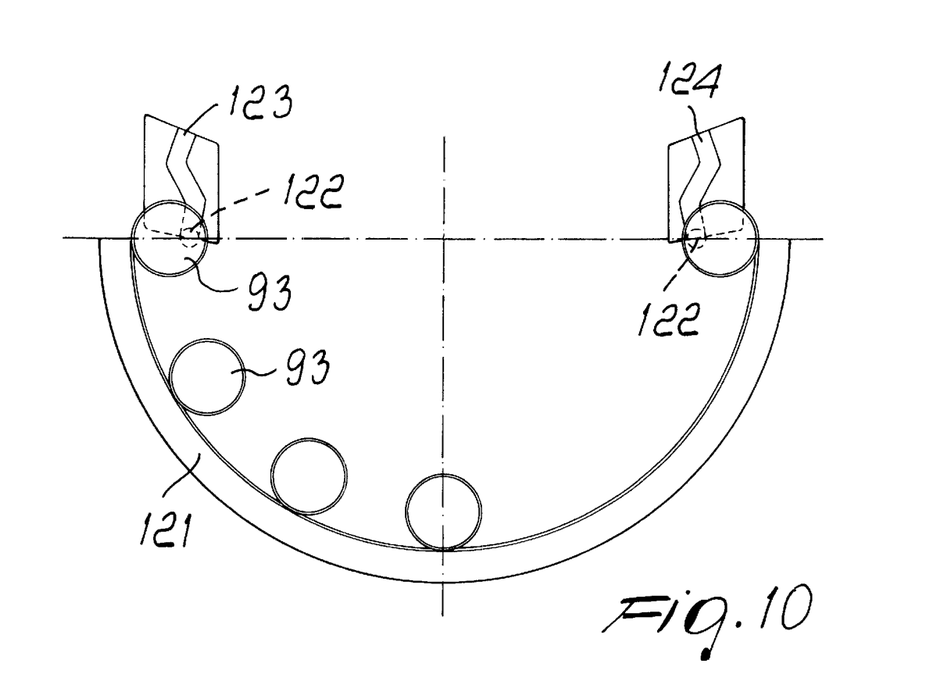
FIG. 10 is a schematic plan view of the embodiment of FIG. 9.

A further embodiment of the present invention, shown in FIGS. 9 and 10, has, instead of the track 97, a toothed sector 121 which lies concentrically to the axis Z and is such as to mesh directly with the gear 93 only at the rotation angle of the carousel in which unscrewing of the cap is provided.

In order to allow meshing with the toothed sector 121, the gear 93 supports a free roller 122 which is eccentric with respect to the rotation axis of the gear 93 and which, at the beginning of the toothed sector 121, moves along an entry cam 123 which is shaped so as to turn the gear 93 so that its teeth can mesh with those of the toothed sector. Likewise, at the exit of the toothed sector 121 a further cam 124 orientates the gear 93 in the angular position that allows the roller 122 to mate with the cam 123.

The kinematic connection of the toothed sector 121 with the gear 93 can be achieved, instead of directly as above-described, by means of an auxiliary gear which is keyed on the shaft 95 above the gear 93.

The disclosures in Italian Patent Application No. BO2000A000256 from which this application claims priority are incorporated herein by reference.

What is claimed is:

1. An apparatus for manufacturing threaded caps by way of compression molding assemblies arranged on a structure of a carousel, which rotates about a vertical central axis thereof, the molding assemblies comprising each an upper male mold half and a lower female mold half aligned with each other along a further vertical axis parallel to said rotation central axis of the carousel; and a seat; said male, mold half including: a tubular element fixed to said structure coaxially to said further parallel axis; a sleeve guided coaxially to said tubular element and having a lower portion; a stem provided at an end thereof with a punch having a helical slot for forming the cap threads, said punch being movably guided in said tubular element; elastic means for exerting a raising action to move said punch up to a raised stroke limit position; actuation means for hydraulic actuation of said female mold half from a lowered position for receiving a dose of plastic material sufficient to form a cap, to a raised position in which said punch enters said female mold half to provide, with the female mold half, a cap molding chamber and compression of said dose of plastic material so as to form a cap, and subsequent descent of the female mold half in order to allow spacing of the female mold half from said punch and removal of said cap from said punch; and removal means for removing said cap from said punch, wherein said removal means comprise: a ring gear associated with said lower portion of said sleeve; a collar provided in sliding contact on said punch at said lower portion of said sleeve and adapted to engage said threaded cap; a rod connected for axial motion transmission to said sleeve and which is axially slidable in said seat of said structure parallel to said rotation central axis of said carousel; a gear which is supported on said rod so as to mesh with said ring gear; motor drive means drivingly connected with said gear; and cam means provided at the structure of the carousel to command, in synchronized operation with said motor drive means, actuation of said rod for axial motion thereof, corresponding movement of said collar in engagement with said threaded cap and respective rotation of the collar for unscrewing said cap from said punch, axial drawing of said punch against the raising action of said elastic means and controlled gradual rise of said punch as unscrewing of the cap advances.

2. The apparatus of claim 1, wherein said cam means comprise a stationary cam including a circular path concentric to the central axis of the carousel which actuates in axial motion said rod, and an axial stationary cam coaxial to said central axis of the carousel which controls movement of said stem and punch so as to prevent sudden upward movement thereof during unscrewing of the cap.

3. The apparatus of claim 2, wherein said ring gear is supported so as to be axially fixedly coupled, and free to rotate, on said lower portion of said sleeve, being provided with said collar, and wherein said removal means comprise; a tubular column which is rotatably supported and is axially slidable in a guiding seat of said carousel; said gear keyed on said tubular column, meshing with said ring gear, and connected to said motor drive means, said tubular column being axially connected to said sleeve, and said rod being cylindrical and arranged so as to be rotatable and axially fixedly coupled inside said tubular column, movement thereof being controlled by said stationary actuation cam, said stationary cam and motor drive means being synchronized for moving axially and turn said collar and produce the unscrewing of said cap from said punch.

4. The apparatus of claim 3, wherein said collar has, at a front part thereof, a plurality of teeth for engaging an edge of the molded cap during rotation of said collar.

5. The apparatus of claim 1, wherein said motor drive means consists of a gear train which comprises: a first gear meshing with said gear even during the axial movements of said rod; a second gear which meshes with said first gear; friction wheels coaxially fixedly coupled to said second gear; and a stationary track which runs concentrically to said central axis over a rotation angle of the carousel over which unscrewing of the cap is provided, said friction wheels engaging tangentially said stationary track.

6. The apparatus of claim 4, wherein said motor drive means consists of a gear train which comprises: a first gear meshing with said gear even during the axial movements of said rod; a second gear meshing with said first gear; a toothed sector which lies concentrically with respect to said rotation central axis of the carousel, and is kinematically connectable to said second gear over a rotation angle of the carousel over which cap unscrewing is provided.

7. The apparatus of claim 6, comprising an entry cam located at said toothed sector, said second gear being provided with a free roller which, at the beginning of said toothed sector, is controlled by said entry cam shaped so as to make said second gear turn for meshing with said toothed sector.

8. The apparatus of claim 4, wherein said tubular column has a pinion actuated in motion by way of a gear train, said pinion having a set of teeth lying axially so as to remain in mesh with said gear train during, the axial movements of said tubular column.

9. The apparatus of claim 4, wherein said rod is connected to said sleeve by way of plate.

10. The apparatus of claim 4, further comprising: a roller located at a top region of said stem, said roller cooperating with said axial stationary cam so as to follow the stem during unscrewing of said punch from the molded cap.

11. The apparatus of claim 10, comprising: a narrow tube arranged coaxially inside said stem, said tube having an inlet, which is connected to a source of compressed air, and an outlet which leads outside of an end portion of said punch; and valve means which feed compressed air into said molded cap after the lower mold half has separated from said punch.

12. An apparatus for manufacturing threaded caps by way of compression molding assemblies arranged on a structure of a carousel, which rotates about a vertical central axis thereof, the molding assemblies comprising each an upper male mold half and a lower female mold half aligned with each other along a further vertical axis parallel to said rotation central axis of the carousel; and a seat; said male mold half including: a tubular element fixed to said structure coaxially to said her parallel axis; a sleeve guided coaxially to said tubular element and having a lower portion; a stem provided at an end thereof with a punch having a helical slot for forming the cap threads, said punch being movably guided in said tubular element; elastic means for exerting a raising action to move said punch up to a raised stroke limit position; actuation means for hydraulic actuation of said female mold half from a lowered position for receiving a dose of plastic material sufficient to form a cap, to a raised position in which said punch enters said female mold half to provide, with the female mold half, a cap molding chamber and compression of said dose of plastic material so as to form a cap, and subsequent descent of the female mold half in order to allow spacing of the female mold half from said punch and removal of said cap from said punch; and removal means for removing said cap from said punch, wherein said removal means comprise: a ring gear associated with said lower portion of said sleeve; a collar provided in sliding contact on said punch at said lower portion of said sleeve and adapted to engage said threaded cap; a rod connected for axial motion transmission to said sleeve and which is axially slidable in said seat of said structure parallel to said rotation central axis of said carousel; a gear which is supported on said rod so as to mesh with said ring gear; motor drive means drivingly connected with said gear; a stationary cam provided at the structure of the carousel to command, in synchronized operation with said motor drive means, actuation of said rod for axial motion thereof, corresponding movement of said collar in engagement with said threaded cap and respective rotation of the collar for unscrewing said cap from said punch, axial drawing of said punch against the raising action of said elastic means; and an axially stationary cam which controls gradual rise of said punch as unscrewing of the cap advances.

13. The apparatus of claim 12, wherein said stationary cam comprises a circular path concentric to the central axis of the carousel adapted to actuate in axial motion said rod.

14. The apparatus of claim 13, further comprising a roller located at a top region of said stem, said axial stationary cam being provided coaxial to said central axis of the carousel, and said roller cooperating with said axial stationary cam to control movement of said stem and punch during unscrewing of said punch from the molded so as to prevent sudden upward movement of the punch during unscrewing of the cap.

15. The apparatus of claim 12, wherein said motor drive means consists of a gear train which comprises: a first gear meshing with said gear even during the axial movements of said rod; a second gear which meshes with said first gear; friction wheels coaxially fixedly coupled to said second gear; and a stationary track which runs concentrically to said central axis over a rotation angle of the carousel over which unscrewing of the cap is provided, said friction wheels engaging tangentially said stationary track.

16. The apparatus of claim 12, wherein said motor drive means consists of a gear train which comprises: a first gear meshing with said gear even during the axial movements of said rod; a second gear meshing with said first gear; a toothed sector which lies concentrically with respect to said rotation central axis of the carousel, and is kinematically connectable to said second gear over a rotation angle of the carousel over which cap unscrewing is provided.

17. The apparatus of claim 12, comprising: a narrow tube arranged coaxially inside said stem, said tube having an inlet, which is connected to a source of compressed air, and an outlet which leads outside of an end portion of said punch; and valve means which feed compressed air into said molded cap after the lower mold half has separated from said punch.

18. An apparatus for manufacturing threaded caps by way of compression molding assemblies arranged on a structure of a carousel, which rotates about a vertical central axis thereof, the molding assemblies comprising each an upper male mold half and a lower female mold half aligned with each other along a further vertical axis parallel to said rotation central axis of the carousel; and a seat; said male mold half including a tubular element fixed to said structure coaxially to said further parallel axis; a sleeve guided coaxially to said tubular element and having a lower portion; a stem provided at an end thereof with a punch having a helical slot for forming the cap threads, said punch being movably guided in said tubular element; elastic means for exerting a raising action to move said punch up to a raised stroke limit position; actuation means for hydraulic actuation of said female mold half from a lowered position for receiving a dose of plastic material sufficient to form a cap, to a raised position in which said punch enters said female mold half to provide, with the female mold half, a cap molding chamber and compression of said dose of plastic material so as to form a cap, and subsequent descent of the female mold half in order to allow spacing of the female mold half from said punch and removal of said cap from said punch; and removal means for removing said cap from said punch, wherein said removal means comprise: a ring gear associated with said lower portion of said sleeve; a collar provided in sliding contact on said punch at said lower portion of said sleeve and adapted to engage said threaded cap; a rod connected for axial motion transmission to said sleeve and which is axially slidable in said seat of said structure parallel to said rotation central axis of said carousel; a gear which is supported on said rod so as to mesh with said ring gear; motor drive means drivingly connected with said gear and comprising a gear train including a first gear meshing with said gear even during the axial movements of said rod and a second gear meshing with said first gear; cam means provided at the structure of the carousel to command, in synchronized operation with said motor drive means and only at a rotation angle of the carousel in which unscrewing of the cap is requested, actuation of said rod for axial motion thereof, corresponding movement of said collar in engagement with said threaded cap and respective rotation of the collar for unscrewing said cap from said punch, axial drawing of said punch against the raising action of said elastic means and controlled gradual rise of said punch as unscrewing of the cap advances.

19. The apparatus of claim 18, wherein said motor drive means further comprise friction wheels coaxially fixedly coupled to said second gem, and a stationary track which runs concentrically to said central axis over a rotation angle of the carousel over which unscrewing of the cap is provided, said friction wheels engaging tangentially said stationary track.

20. The apparatus of claim 18, wherein said motor drive means further comprise a toothed sector which lies concentrically with respect to said rotation central axis of the carousel and is kinematically connectable to said second gear over a rotation angle of the carousel over which cap unscrewing is provided.

* * * * *